United States Patent
Ogihara et al.

(10) Patent No.: US 10,549,681 B2
(45) Date of Patent: Feb. 4, 2020

(54) WORK MACHINE MANAGEMENT SYSTEM AND WORK MACHINE MANAGEMENT METHOD

(71) Applicant: Komatsu Ltd., Tokyo (JP)

(72) Inventors: Masanori Ogihara, Tokyo (JP); Koji Takeda, Tokyo (JP); Tomonori Ozaki, Tokyo (JP); Akiharu Nishijima, Tokyo (JP); Ryuuen Kou, Tokyo (JP)

(73) Assignee: Komatsu LTD., Tokyo (JP)

( * ) Notice: Subject to any disclaimer, the term of this patent is extended or adjusted under 35 U.S.C. 154(b) by 0 days.

(21) Appl. No.: 16/083,536

(22) PCT Filed: Dec. 26, 2016

(86) PCT No.: PCT/JP2016/088781
§ 371 (c)(1),
(2) Date: Sep. 10, 2018

(87) PCT Pub. No.: WO2017/168895
PCT Pub. Date: Oct. 5, 2017

(65) Prior Publication Data
US 2019/0084474 A1      Mar. 21, 2019

(30) Foreign Application Priority Data
Mar. 31, 2016   (JP) ................. 2016-073239

(51) Int. Cl.
*B60Q 1/34* (2006.01)
*G05D 1/02* (2006.01)
*G06K 9/00* (2006.01)

(52) U.S. Cl.
CPC .......... *B60Q 1/346* (2013.01); *G05D 1/0214* (2013.01); *G05D 1/0238* (2013.01); *G06K 9/00805* (2013.01); *G05D 2201/021* (2013.01)

(58) Field of Classification Search
CPC .............................. E02F 3/842; G05D 1/0221
(Continued)

(56) References Cited

U.S. PATENT DOCUMENTS

| 6,044,312 A * | 3/2000 | Sudo ........................ E02F 3/842 |
| | | 340/988 |
| 6,539,294 B1 * | 3/2003 | Kageyama .............. E02F 3/842 |
| | | 180/168 |

(Continued)

FOREIGN PATENT DOCUMENTS

| JP | 63-307506 A | 12/1988 |
| JP | 05-324058 A | 12/1993 |

(Continued)

OTHER PUBLICATIONS

International Search Report dated Feb. 7, 2017, issued for PCT/JP2016/088781.

*Primary Examiner* — Fabricio R Murillo Garcia
(74) *Attorney, Agent, or Firm* — Locke Lord LLP

(57) ABSTRACT

A work machine management system includes: an obstacle data acquisition unit that acquires position data of an obstacle; a detour course setting unit that sets detour course data that is a detour course of course data along which a work machine travels based on the position data of the obstacle; a turn signal data setting unit that sets turn signal data to control a direction indicator of the work machine in the detour course; and an output unit that outputs the turn signal data to the work machine.

8 Claims, 10 Drawing Sheets

(58) Field of Classification Search
USPC .......................................................... 340/463
See application file for complete search history.

(56) References Cited

U.S. PATENT DOCUMENTS

| | | | | |
|---|---|---|---|---|
| 2005/0248449 | A1* | 11/2005 | Ponziani | B60Q 1/346 340/475 |
| 2011/0106376 | A1* | 5/2011 | Tijerina | B60Q 1/346 701/36 |
| 2015/0075954 | A1* | 3/2015 | Mizuno | B60Q 1/343 200/61.3 |
| 2016/0031448 | A1 | 2/2016 | Sakai | |

FOREIGN PATENT DOCUMENTS

| | | |
|---|---|---|
| JP | 11-296229 A | 10/1999 |
| JP | 2010-202021 A | 9/2010 |
| WO | 2015/033708 A1 | 3/2015 |

\* cited by examiner

WORK MACHINE MANAGEMENT SYSTEM AND WORK MACHINE MANAGEMENT METHOD

FIELD

The present invention relates to a work machine management system and a work machine management method.

BACKGROUND

There is a case where both a work machine that travels in an unattended manner and a manned vehicle operate in the same mine. If a driver operating the manned vehicle can grasp a traveling direction of a mining machine that travels in an unattended manner at an intersection, for example, the safety in a mine is improved. Patent Literature 1 discloses a technique of a direction indication scheme in an autonomous traveling automatic guided vehicle.

CITATION LIST

Patent Literature

Patent Literature 1: Japanese Laid-open Patent Publication No. 05-324058 A

SUMMARY

Technical Problem

It is considered that the use of a direction indicator contributes to improvement of the safety in the mine. However, a technique of using the direction indicator in the work machine that travels in an unattended manner has not been established.

An aspect of the present invention aims to provide a work machine management system and a work machine management method capable of improving safety in a mine.

Solution to Problem

According to a first aspect of the present invention, a work machine management system comprises: an obstacle data acquisition unit that acquires position data of an obstacle; a detour course setting unit that sets detour course data that is a detour course of course data along which a work machine travels based on the position data of the obstacle; a turn signal data setting unit that sets turn signal data to control a direction indicator of the work machine in the detour course; and an output unit that outputs the turn signal data to the work machine.

According to a second aspect of the present invention, a work machine management method comprises: acquiring position data of an obstacle; setting a detour course of a work machine traveling in accordance with course data based on the position data of the obstacle; setting turn signal data to control a direction indicator of the work machine in the detour course; and outputting the turn signal data to the work machine.

Advantageous Effects of Invention

According to an aspect of the present invention, provided are a work machine management system and a work machine management method capable of improving the safety in the mine.

DESCRIPTION OF EMBODIMENTS

Hereinafter, embodiments of the present invention will be described with reference to the drawings, but the present invention is not limited thereto.

Figure 1:
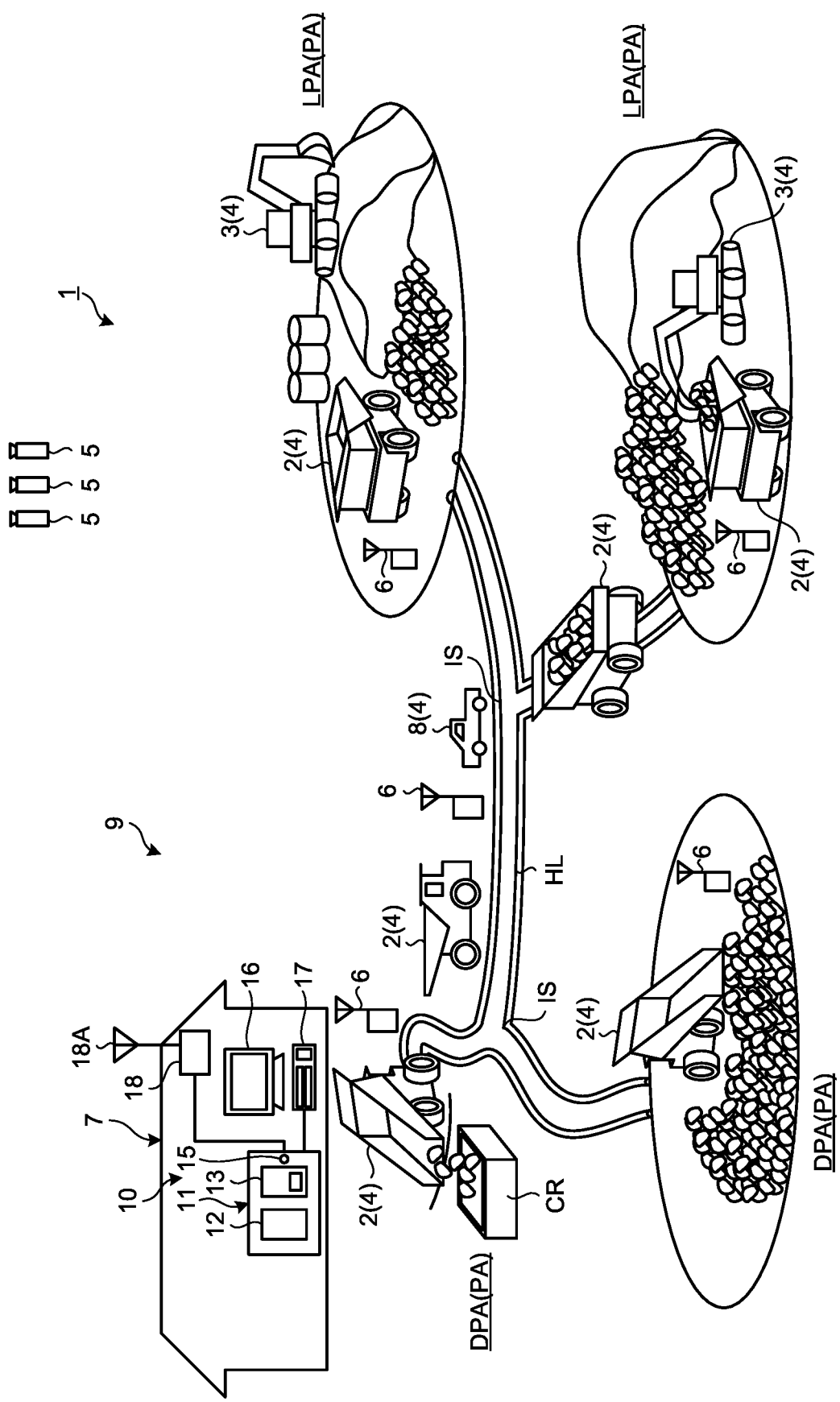
FIG. 1 is a view schematically illustrating an example of a management system of a mining machine according to the present embodiment.

FIG. 1 is a view illustrating an example of a management system 1 of a work machine according to the present embodiment. In the present embodiment, an example in which the work machine is a mining machine 4 operating in a mine will be described. The management system 1 performs management of the mining machine 4. The management of the mining machine 4 includes at least one of operation management of the mining machine 4, evaluation of the productivity of the mining machine 4, the evaluation of an operation technique of an operator of the mining machine 4, preservation of the mining machine 4, and abnormality diagnosis of the mining machine 4.

The mining machine 4 is a generic term of machinery used in various operations in the mine. The mining machine 4 includes at least one of a boring machine, an excavation machine, a loading machine, a transporting machine, a crusher, and a vehicle operated by a driver. The excavation machine is a mining machine for excavating the mine. The loading machine is a mining machine for loading a load on the transporting machine. The loading machine includes at least one of an excavator, an electric excavator, and a wheel loader. The transporting machine is a mining machine for transporting a load. The crusher is a mining machine that crushes earth charged from the transporting machine. The mining machine 4 is movable in the mine.

In the present embodiment, the mining machine 4 includes a dump truck 2 which is the transporting machine capable of traveling in the mine, other mining machines 3 different from the dump truck 2, and a manned vehicle 8 operated by the driver. In the present embodiment, an example in which the dump truck 2 is mainly managed by the management system 1 will be described.

As illustrated in FIG. 1, the dump truck 2 travels at least a part of a work site PA of the mine and a transport path HL leading to the work site PA. The work site PA includes at least one of a loading site LPA and a discharging site DPA. The transport path HL includes an intersection IS. The dump truck 2 travels in accordance with course data indicating a target traveling route set in the transport path HL and the work site PA.

The loading site LPA is a range in which a loading operation of loading a load onto the dump truck 2 is performed. The discharging site DPA is a range in which a discharging operation of discharging the load from the dump truck 2 is performed. In the example illustrated in FIG. 1, a crusher CR is provided in at least a part of the discharging site DPA.

In the present embodiment, a description will be given on the premise that the dump truck 2 is an unmanned dump truck that autonomously travels in the mine based on a command signal from a management device 10. The autonomous traveling of the dump truck 2 means traveling based on the command signal from the management device 10 without depending on the driver's operation.

In FIG. 1, the management system 1 includes the management device 10 disposed in a control facility 7 installed in the mine, and a communication system 9. The communication system 9 has a plurality of repeaters 6 that relay data or a command signal. The communication system 9 wirelessly communicates data or a command signal between the management device 10 and the mining machine 4. In addition, the communication system 9 wirelessly communicates data or a command signal among the plurality of mining machines 4.

In the present embodiment, a position of the dump truck 2 and a position of the other mining machine 3 are detected using a global navigation satellite system (GNSS). The GNSS is a global navigation satellite system. An example of the global navigation satellite system is a global positioning system (GPS). The GNSS has a plurality of positioning satellites 5. The GNSS detects a position defined by coordinate data of a latitude, a longitude, and an altitude. The position detected by the GNSS is an absolute position defined in a global coordinate system. The position of the dump truck 2 and the position of the other mining machine 3 in the mine are detected by the GNSS.

In the following description, the position detected by the GNSS will be referred to as a GPS position as appropriate. The GPS position is an absolute position and includes coordinate data of a latitude, a longitude, and an altitude. The absolute position includes an estimated position of the dump truck 2 estimated with high accuracy.

Next, the management device 10 will be described. The management device 10 transmits data or a command signal to the mining machine 4 and receives data from the mining machine 4. As illustrated in FIG. 1, the management device 10 includes a computer 11, a display device 16, an input device 17, and a wireless communication device 18.

The computer 11 includes a processing device 12, a storage device 13, and an input/output unit 15. The display device 16, the input device 17, and the wireless communication device 18 are connected to the computer 11 via the input/output unit 15.

The processing device 12 performs arithmetic processing for managing the mining machine 4. The storage device 13 is connected to the processing device 12 and stores data for managing the mining machine 4. The input device 17 is operated by an administrator to generate input data for managing the mining machine 4 and supplies the generated data to the processing device 12. The input device 17 includes at least one of a keyboard for a computer, a mouse, and a touch sensor provided on a display screen of the display device 16, for example. The display device 16 includes a flat panel display such as a liquid crystal display. The processing device 12 performs the arithmetic processing using data stored in the storage device 13, data input from the input device 17, and data acquired via the communication system 9. The display device 16 displays a result of the arithmetic processing of the processing device 12 and the like.

The wireless communication device 18 has an antenna 18A and is disposed in the control facility 7. The wireless communication device 18 is connected to the processing device 12 via the input/output unit 15. The communication system 9 includes the wireless communication device 18. The wireless communication device 18 is capable of receiving data transmitted from the mining machine 4. The data received by the wireless communication device 18 is output to the processing device 12 and stored in the storage device 13. The wireless communication device 18 is capable of transmitting data to the mining machine 4.

Figure 2:
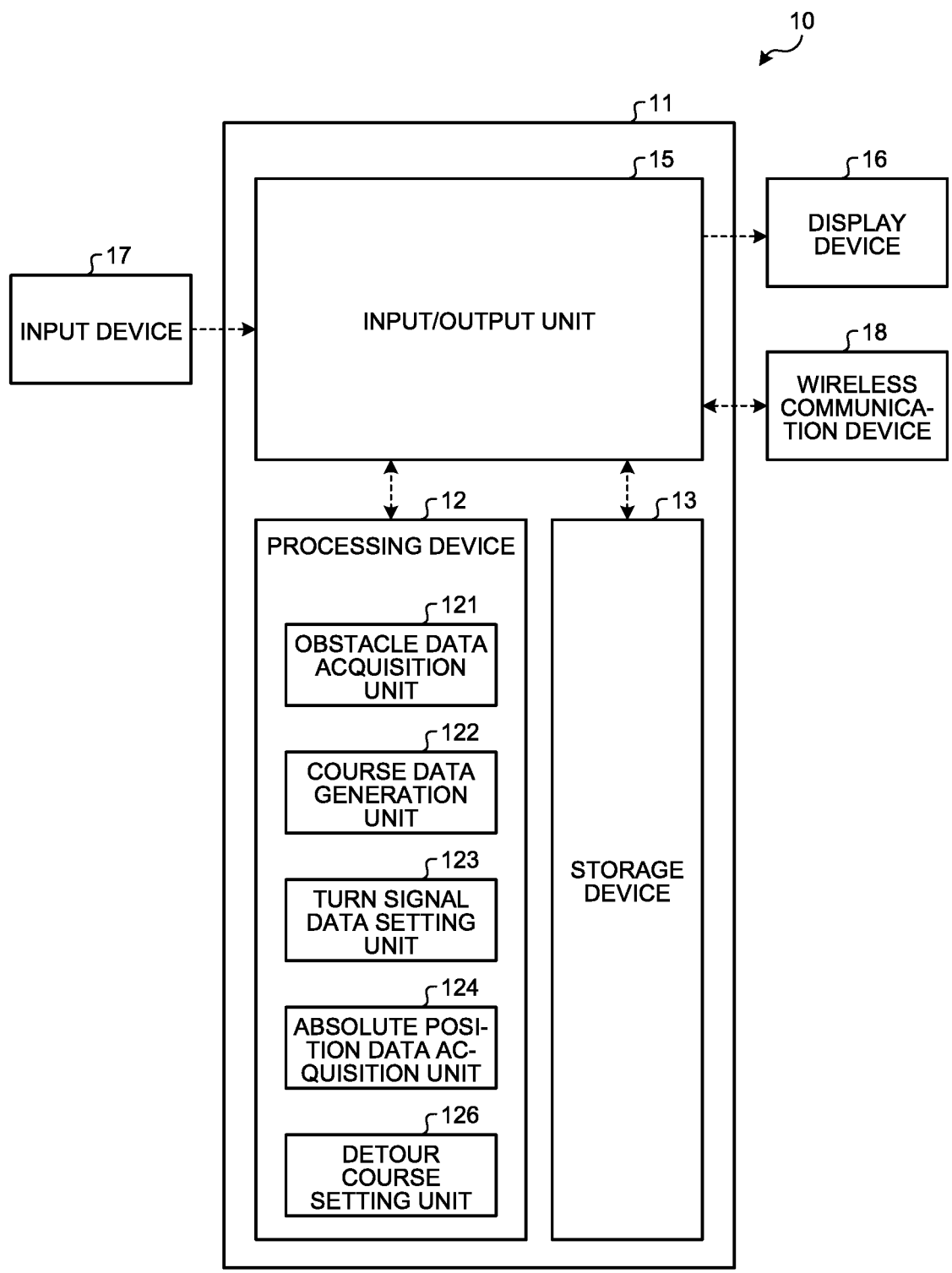
FIG. 2 is a functional block diagram illustrating an example of the management system of the mining machine according to the present embodiment.

FIG. 2 is a functional block diagram illustrating an example of the management device 10 according to the present embodiment. As illustrated in FIG. 2, the processing device 12 of the management device 10 includes: an obstacle data acquisition unit 121 that acquires position data of an obstacle existing in the transport path HL or the work site PA; a course data generation unit 122 that generates course data indicating a travel course of the dump truck 2; a detour course setting unit 126 that sets detour course data which is a detour course of the dump truck 2 traveling in accordance with the course data based on the position data of the obstacle; a turn signal data setting unit 123 that sets turn signal data for controlling a direction indicator 37 of the dump truck 2 in the detour course; and an absolute position data acquisition unit 124 that acquires absolute position data of the dump truck 2. The turn signal data is output from the input/output unit 15 functioning as an output unit to the dump truck 2 traveling in accordance with the course data via the wireless communication device 18. In addition, the turn signal data is stored in the storage device 13.

Figure 3:
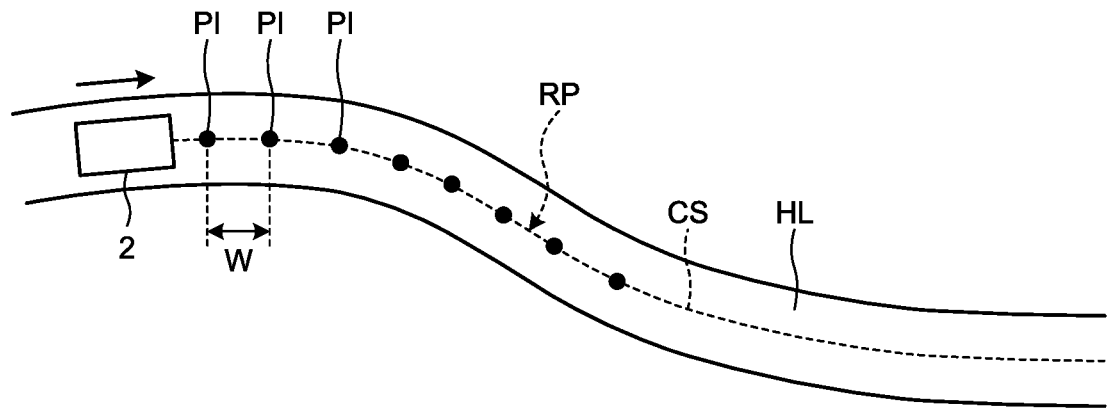
FIG. 3 is a schematic view for describing a target traveling route of a dump truck according to the present embodiment.

FIG. 3 is a schematic view illustrating the dump truck 2 traveling on the transport path HL. The course data generation unit 122 of the processing device 12 generates traveling condition data including the course data of the dump truck 2 traveling in the mine. The traveling condition data includes an aggregate of a plurality of course points PI set at a constant interval W.

Each of the plurality of course points PI includes target absolute position data of the dump truck 2, target traveling speed data of the dump truck 2 at a position where the course point PI has been set, and target orientation data of the dump truck 2 at the position where the course point PI has been set. A target traveling route RP is defined by course data CS which is the aggregate of the plurality of course points PI. The target traveling route RP of the dump truck 2 is defined by a trajectory passing through the plurality of course points PI. The target traveling speed of the dump truck 2 at the position where the course point PI has been set is defined based on the target traveling speed data. An orientation of the dump truck 2 at the position where the course point PI has been set is defined based on the target orientation data.

In addition, each of the plurality of course points PI includes turn signal data for controlling the direction indicator 37 of the dump truck 2. The turn signal data is data indicating an operation condition of the direction indicator 37 when the dump truck 2 passes through the position of the course point PI. The turn signal data includes data to turn on a turn signal lamp 37R for right turn of the direction indicator 37, data to turn on a turn signal lamp 37L for left turn of the direction indicator 37, data to simultaneously turn on the turn signal lamp 37R for right turn and the turn signal lamp 37L for left turn, and data to turn off the turn signal lamp 37R and the turn signal lamp 37L.

In the present embodiment, the turn signal data setting unit 123 sets the turn signal data to the course point PI based on the detour course data set by the detour course setting unit 126 of the management device 10. Each of the plurality of course points PI includes target absolute position data, target traveling speed data, target orientation data, and turn signal data.

The management device 10 outputs the traveling condition data including the plurality of course points PI on the front side in the traveling direction to the dump truck 2 via the wireless communication device 18. The dump truck 2 travels on the mine in accordance with the traveling condition data transmitted from the management device 10. In addition, the dump truck 2 controls the direction indicator 37 in accordance with the turn signal data transmitted from the management device 10.

Figure 4:
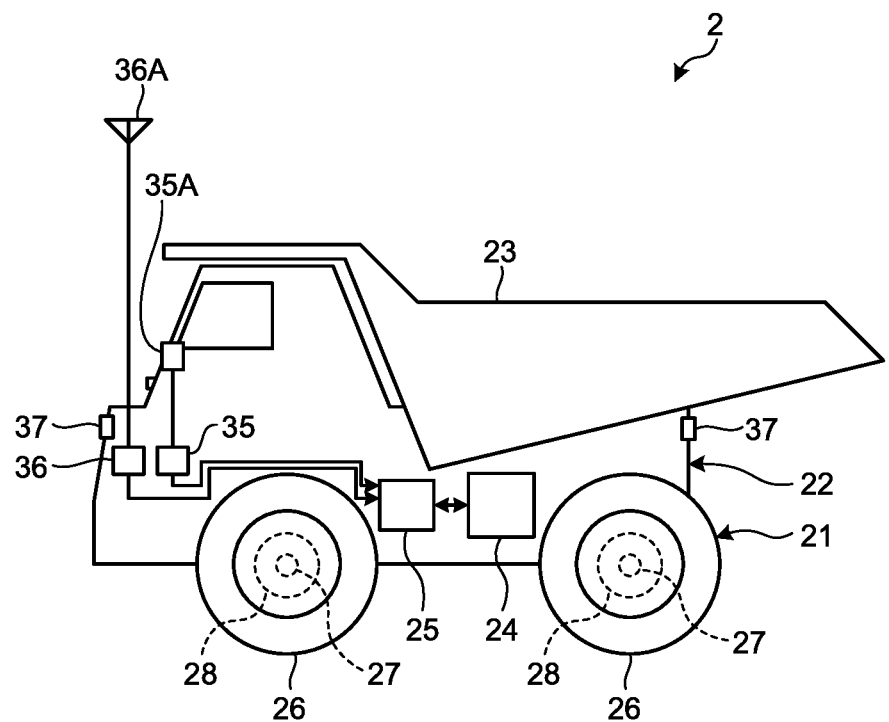
FIG. 4 is a view schematically illustrating an example of the dump truck according to the present embodiment.
Figure 5:
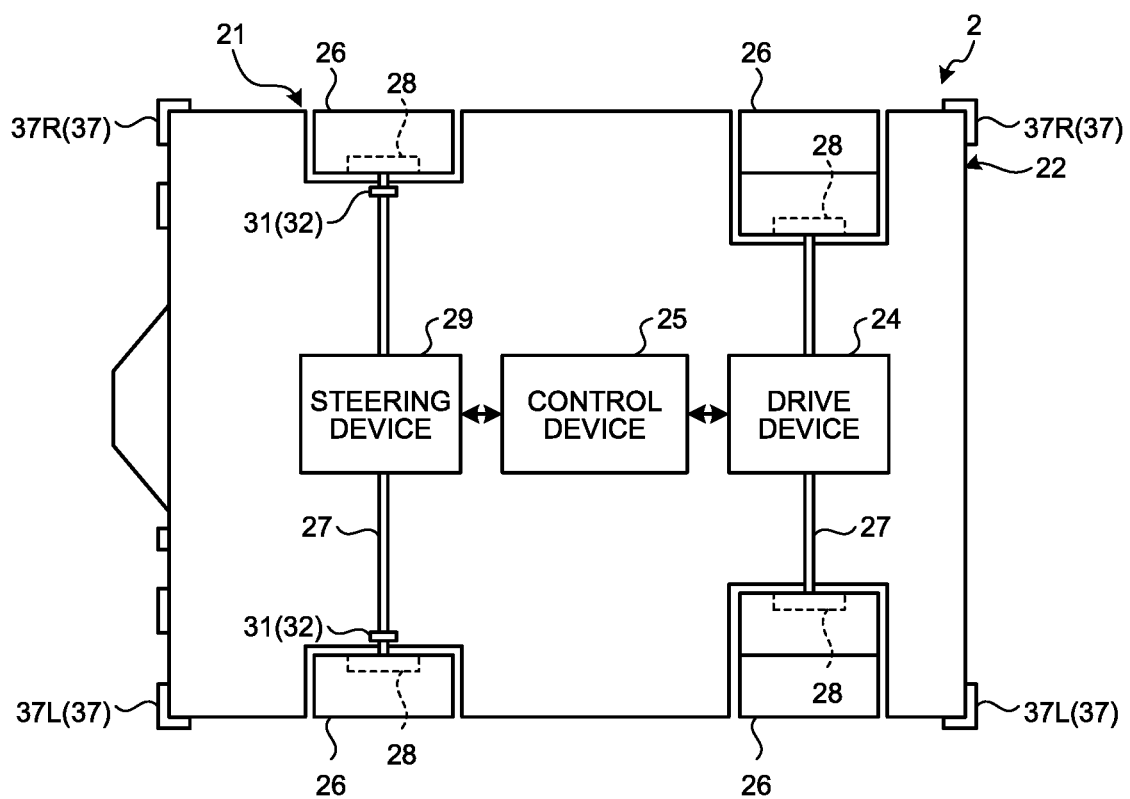
FIG. 5 is a view schematically illustrating an example of the dump truck according to the present embodiment.

Next, the dump truck 2 according to the present embodiment will be described. FIGS. 4 and 5 are views schematically illustrating an example of the dump truck 2 according to the present embodiment.

The dump truck 2 includes a traveling device 21 capable of traveling on the mine, a vehicle body 22 supported by the traveling device 21, a vessel 23 supported by the vehicle body 22, a drive device 24 for driving the traveling device 21, a direction indicator 37, and a control device 25.

The traveling device 21 has wheels 26, axles 27 rotatably supporting the wheels 26, a brake device 28 braking the traveling device 21, and a steering device 29 capable of adjusting the traveling direction.

The traveling device 21 is operated by a driving force generated by the drive device 24. The drive device 24 generates the driving force for accelerating the dump truck 2. The drive device 24 drives the traveling device 21 by an electric drive scheme. The drive device 24 has an internal combustion engine such as a diesel engine, a generator operated by motive power of the internal combustion engine, and an electric motor operated by power generated by the generator. The driving force generated by the electric motor is transmitted to the wheels 26 of the traveling device 21. As a result, the traveling device 21 is driven. The dump truck 2 autonomously travels by the driving force of the drive device 24 provided in the vehicle body 22. As the output of the drive device 24 is adjusted, the traveling speed of the dump truck 2 is adjusted. Incidentally, the drive device 24 may drive the traveling device 21 by a mechanical driving scheme. For example, the motive power generated by the internal combustion engine may be transmitted to the wheels 26 of the traveling device 21 via a power transmission device.

The steering device 29 is capable of adjusting the traveling direction of the traveling device 21. The traveling direction of the dump truck 2 including the traveling device 21 includes a direction of a front portion of the vehicle body 22. The steering device 29 adjusts the traveling direction of the dump truck 2 by changing the direction of the wheels 26.

The brake device 28 generates a braking force for decelerating or stopping the dump truck 2. The control device 25 outputs an accelerator command signal for operating the drive device 24, a brake command signal for operating the brake device 28, and a steering command signal for operating the steering device 29. The drive device 24 generates a driving force for accelerating the dump truck 2 based on the accelerator command signal output from the control device 25. The brake device 28 generates a braking force for decelerating the dump truck 2 based on the brake command signal output from the control device 25. The steering device 29 generates a force for changing a direction of the wheels 26 so as to make the dump truck 2 travel straight or swing based on the steering command signal output from the control device 25.

The direction indicator 37 displays the traveling direction of the dump truck 2. The direction indicator 37 is disposed at each of the front portion and a rear portion of the vehicle body 22. The direction indicator 37 includes the turn signal lamp and notifies the surroundings of the traveling direction of the dump truck 2 by causing the turn signal lamp to be turned on or blink. The direction indicator 37 includes the turn signal lamp 37R for right turn to be lighted when the dump truck 2 turns right and the turn signal lamp 37L for left turn to be lighted when the dump truck 2 turns left. The turn signal lamp 37R for right turn is disposed on the right side of the vehicle body 22 in the vehicle width direction of the dump truck 2 and the turn signal lamp 37L for left turn is disposed on the left side of the vehicle body 22 in the vehicle width direction of the dump truck 2.

In the following description, the lighting of the turn signal lamp 37R will be referred to as right-turn lighting as appropriate, and the lighting of the turn signal lamp 37L will be referred to as left-turn lighting as appropriate.

In addition, the dump truck 2 includes a traveling speed detector 31 that detects the traveling speed of the dump truck 2, an acceleration detector 32 that detects the acceleration of the dump truck 2, a position detector 35 that detects the position of the dump truck 2, and a wireless communication device 36.

The traveling speed detector 31 detects the traveling speed of the dump truck 2. The traveling speed detector 31 includes a rotation speed sensor that detects the rotation speed of the wheels 26. Since the rotation speed of the wheels 26 correlates with the traveling speed of the dump truck 2, a rotation speed value, which is a detection value of the rotation speed sensor, is converted into a traveling speed value of the dump truck 2. Incidentally, the traveling speed detector 31 may detect the rotation speed of the wheels 26.

The acceleration detector 32 detects the acceleration of the dump truck 2. The acceleration of the dump truck 2 includes a positive acceleration and a negative acceleration (deceleration). In the present embodiment, the arithmetic processing is executed based on the rotation speed value, which is the detection value of the rotation speed sensor that detects the rotation speed of the wheels 26, and thus, the rotation speed value is converted into an acceleration value of the dump truck 2. Incidentally, the traveling speed detector 31 and the acceleration detector 32 may be separate detectors.

The position detector 35 includes a GPS receiver and detects the GPS position (coordinates) of the dump truck 2. The position detector 35 has a GPS antenna 35A. The antenna 35A receives radio waves from the positioning satellite 5. The position detector 35 converts a signal based on the radio wave from the positioning satellite 5, received by the antenna 35A, into an electric signal to calculate a position of the antenna 35A. The GPS position of the dump truck 2 is detected by calculating the GPS position of the antenna 35A.

The communication system 9 includes the wireless communication device 36 provided in the dump truck 2. The wireless communication device 36 has an antenna 36A. The wireless communication device 36 can wirelessly communicate with the management device 10.

The management device 10 transmits a command signal including the traveling condition data of the dump truck 2 to the control device 25 via the communication system 9. The control device 25 controls at least one of the drive device 24, the brake device 28, and the steering device 29 of the dump truck 2 based on the traveling condition data supplied from the management device 10 such that the dump truck 2 travels in accordance with the traveling condition data (including the absolute position data, the target traveling speed, the target orientation angle at the plurality of course points PI).

In addition, the dump truck 2 transmits the absolute position data indicating the absolute position of the dump truck 2 detected by the position detector 35 to the management device 10 via the communication system 9. The absolute position data acquisition unit 124 of the management device 10 acquires the absolute position data of the plurality of dump trucks 2 traveling on the mine. In addition, the absolute position data acquisition unit 124 of the management device 10 acquires the absolute position data of not only the dump truck 2 but also the other mining machine 3 including the position detector 35.

Figure 6:
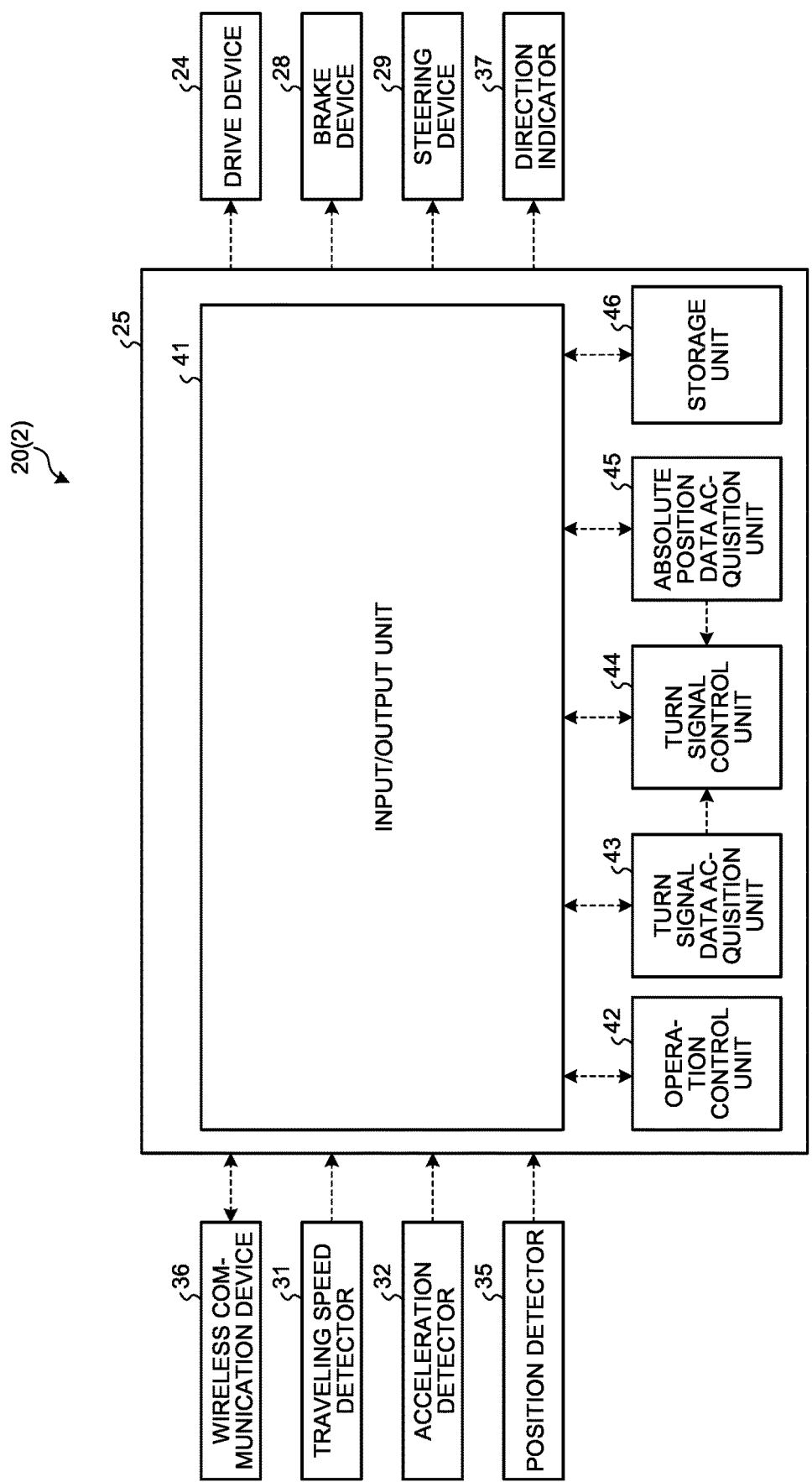
FIG. 6 is a functional block diagram illustrating an example of a control system of the dump truck according to the present embodiment.

Next, a control system 20 of the dump truck 2 according to the present embodiment will be described. FIG. 6 is a control block diagram of the control system 20 according to the present embodiment. The control system 20 is mounted on the dump truck 2.

As illustrated in FIG. 6, the control system 20 includes a wireless communication device 36, a traveling speed detector 31, an acceleration detector 32, a position detector 35, a control device 25, a drive device 24, a brake device 28, a steering device 29, and the direction indicator 37.

The control device 25 includes an input/output unit 41, an operation control unit 42, a turn signal data acquisition unit 43, a turn signal control unit 44, an absolute position data acquisition unit 45, and a storage unit 46.

The input/output unit 41 acquires the turn signal data and traveling condition data output from the management device 10, the traveling speed data indicating a traveling speed of the dump truck 2 output from the traveling speed detector 31, acceleration data indicating an acceleration of the dump truck 2 output from the acceleration detector 32, and position data indicating the position of the dump truck 2 output from the position detector 35. In addition, the input/output unit 41 outputs an accelerator command signal to the drive device 24, outputs a brake command signal to the brake device 28, and outputs a steering command signal to the steering device 29.

The operation control unit 42 outputs an operation control signal to control the traveling device 21 of the dump truck 2 based on the designated traveling condition data. The traveling device 21 includes the brake device 28 and the steering device 29. The operation control unit 42 outputs an operation control signal to the traveling device 21 including the drive device 24, the brake device 28, and the steering device 29. The operation control signal includes an accelerator signal output to the drive device 24, the brake command signal output to the brake device 28, and the steering command signal output to the steering device 29.

The turn signal data acquisition unit 43 acquires the turn signal data output from the management device 10 in order to control the direction indicator 37 of the dump truck 2.

The turn signal control unit 44 outputs a turn signal control signal to the direction indicator 37 provided on the dump truck 2 based on the turn signal data acquired by the turn signal data acquisition unit 43. The turn signal control signal includes a light-on signal to turn on the direction indicator 37 and a light-off signal to turn off the direction indicator 37. The light-on signal includes a right turn light-on signal, a left turn light-on signal, and a hazard light-on signal to simultaneously perform the right turn lighting and the left turn lighting.

The absolute position data acquisition unit 45 acquires absolute position data of the dump truck 2 from detection data of the position detector 35.

The storage unit 46 stores the traveling condition data of the dump truck 2 acquired by the wireless communication device 36. The traveling condition data includes the turn signal data to control the direction indicator 37.

Figure 7:
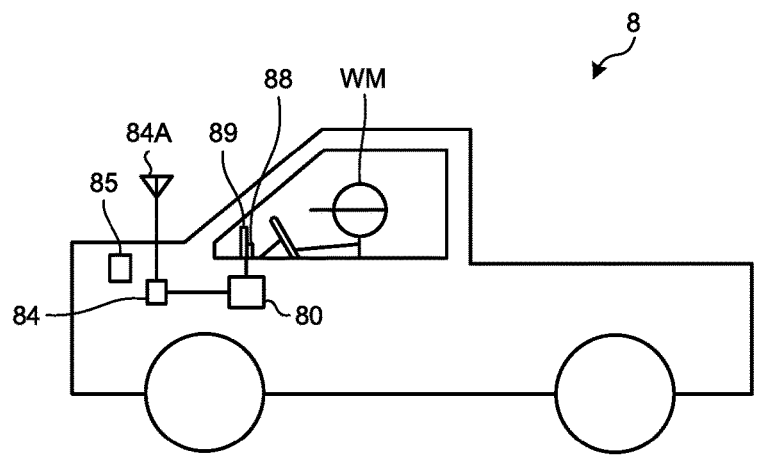
FIG. 7 is a view schematically illustrating an example of a manned vehicle according to the present embodiment.
Figure 8:
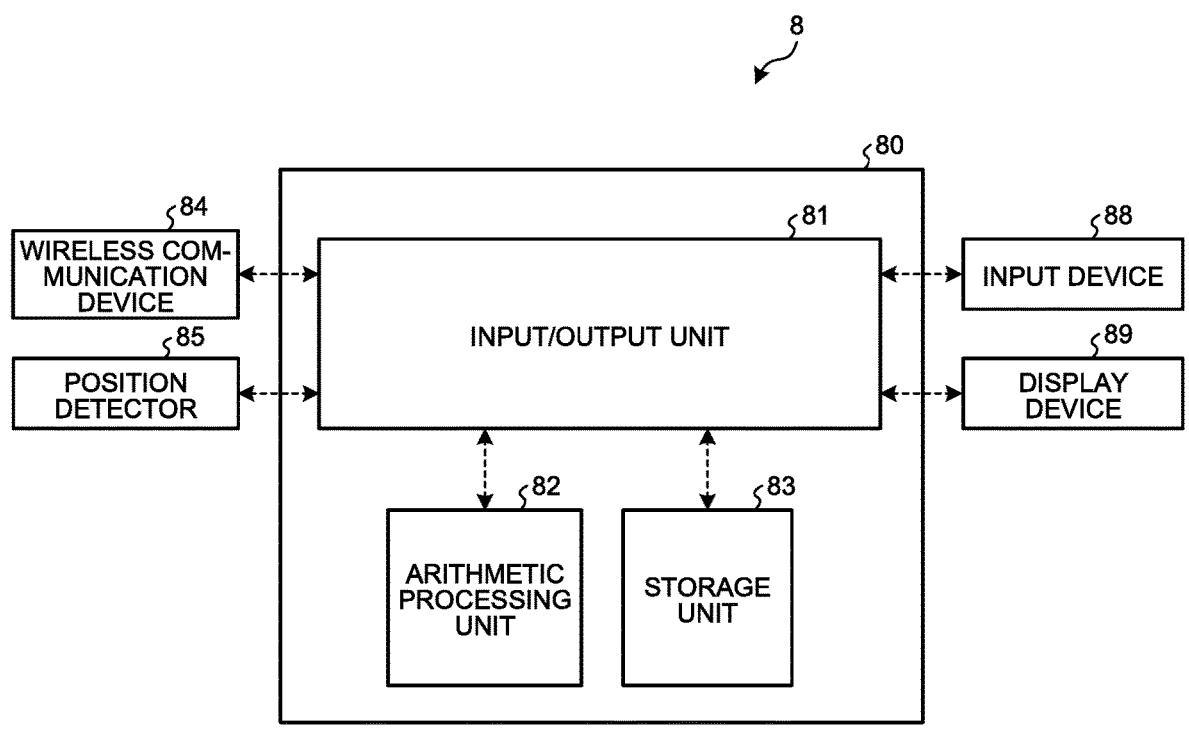
FIG. 8 is a functional block diagram illustrating an example of a control system of the manned vehicle according to the present embodiment.

Next, the manned vehicle 8 according to the present embodiment will be described. FIG. 7 is a view schematically illustrating an example of the manned vehicle 8 according to the present embodiment. FIG. 8 is a control block diagram of a control system of the manned vehicle 8 according to the present embodiment. The control system of the manned vehicle 8 is mounted on the manned vehicle 8.

As illustrated in FIG. 7, the manned vehicle 8 has a driver's cab on which a driver WM boards. The manned vehicle 8 is operated by the driver WM who is aboard the cab. The manned vehicle 8 is, for example, a passenger car-type vehicle and is smaller than the dump truck 2.

The manned vehicle 8 has a position detector 85 that acquires position data of the manned vehicle 8. The position detector 85 includes a GPS receiver and detects a GPS position (coordinates) of the manned vehicle 8.

As illustrated in FIGS. 7 and 8, the control system of the manned vehicle 8 includes a computer 80, a wireless communication device 84, the position detector 85, an input device 88, and a display device 89. The wireless communication device 84 performs wirelessly communication via an antenna 84A. The input device 88 and the display device 89 are provided in the cab of the manned vehicle 8.

The computer 80 includes an input/output unit 81, an arithmetic processing unit 82, and a storage unit 83.

The arithmetic processing unit 82 acquires the position data of the manned vehicle 8 detected by the position detector 85. In addition, the arithmetic processing unit 82 acquires input data generated by operating the input device 88. The storage unit 83 stores input data from the input device 88.

The input/output unit 81 outputs the position data of the manned vehicle 8 and the input data generated by operating the input device 88 to the management device 10 via the wireless communication device 84. Incidentally, the input/output unit 81 may output the position data and the input data to the dump truck 2 via the wireless communication device 84.

The wireless communication device 84 can perform data communication with the management device 10 and the dump truck 2. The communication system 9 includes the wireless communication device 84.

The input device 88 and the display device 89 are disposed in the cab of the manned vehicle 8. The input device 88 is operated by the driver WM to generate input data for managing the mining machine 4 and supply the generated data to the computer 80. The input device 88 includes at least one of a keyboard for a computer, a mouse, and a touch sensor provided on a display screen of the display device 89, for example. The display device 89 includes a flat panel display such as a liquid crystal display.

Figure 9:
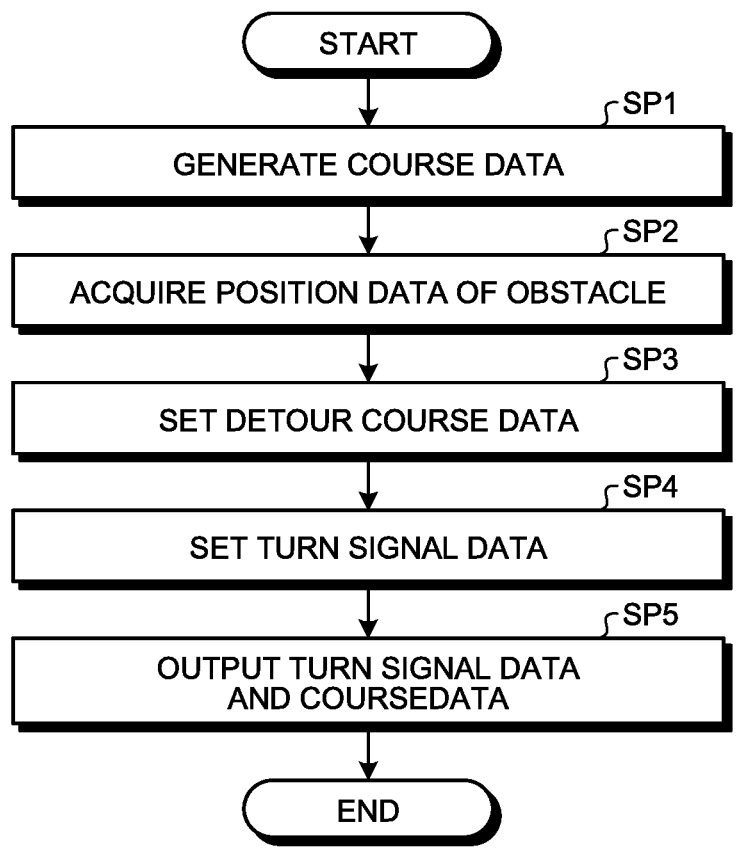
FIG. 9 is a flowchart illustrating an example of an operation of a management system according to the present embodiment.

Next, a method of managing the dump truck 2 according to the present embodiment will be described. FIG. 9 is a flowchart illustrating an example of an operation of the management system 1 according to the present embodiment.

In the course data generation unit 122 of the management device 10, the traveling condition data including the course data CS of the dump truck 2 is generated (step SP1). The generated traveling condition data is transmitted from the management device 10 to the dump truck 2. The dump truck 2 travels on the transport path HL or the work site PA in accordance with traveling condition including course data CS.

For example, there is a possibility that an obstacle is present on the transport path HL. A stone that falls on the transport path HL, a depressed portion of the transport path HL, a vehicle that is stopped due to failure, or the like is exemplified as the obstacle.

Figure 10:
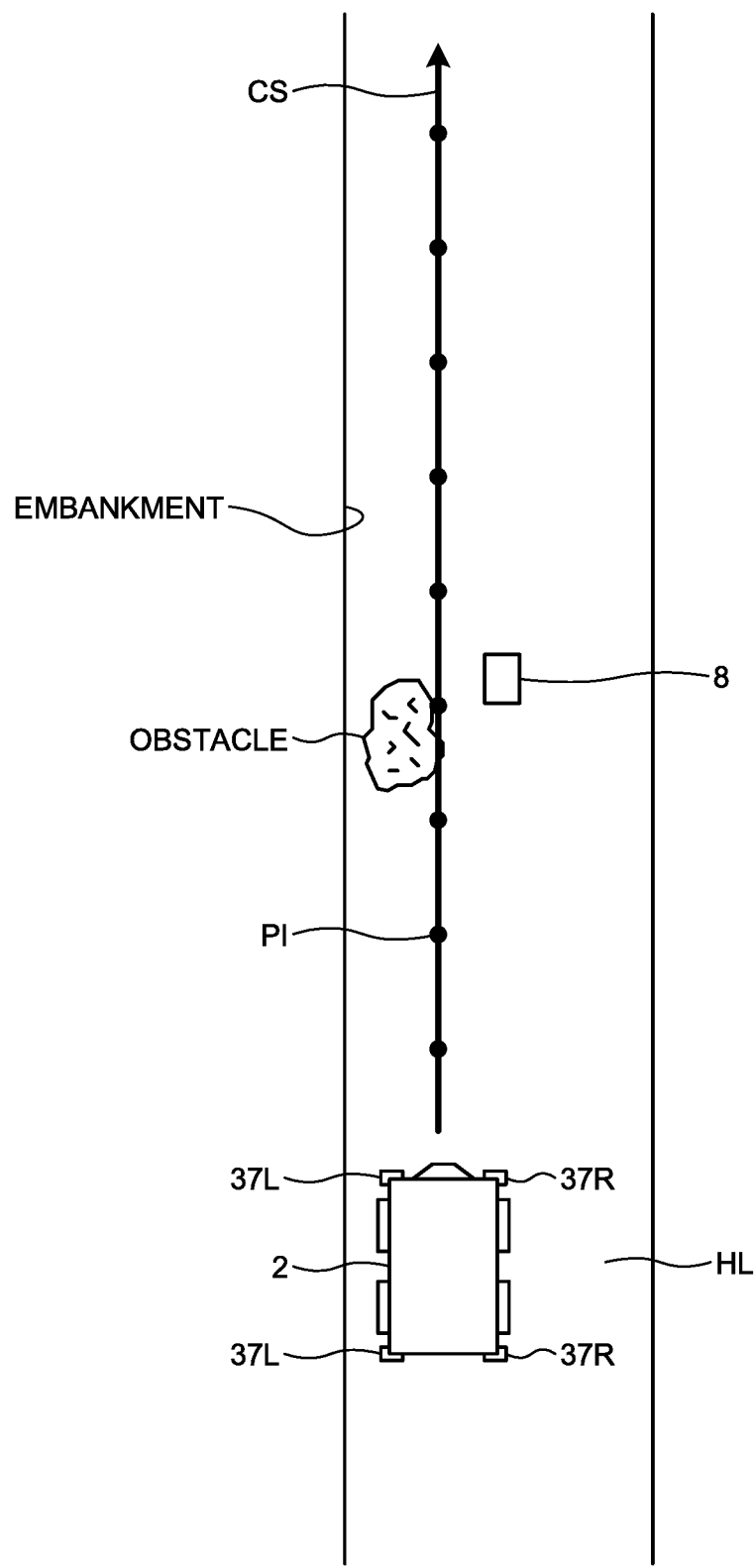
FIG. 10 is a view for describing traveling control and direction indicator control for the dump truck according to the present embodiment.

FIG. 10 is an example schematically illustrating an example in which the obstacle is present on the transport path HL. When a state where an obstacle is present on a course indicated by the course data CS is left as it is, for example, as illustrated in FIG. 10, the traveling of the dump truck 2 traveling in accordance with the course data CS is hindered. As a result, the productivity of the mine decreases.

When the dump truck 2 is operated, the manned vehicle 8 travels around the mine for early finding of an obstacle or early finding of an accident. In the present embodiment, the manned vehicle 8 traveling around the mine transmits the position data of the obstacle to the management device 10.

As illustrated in FIG. 10, when the driver WM of the manned vehicle 8 finds an obstacle in the transport path HL, the manned vehicle 8 is moved close to the obstacle. The driver WM manipulates the input device 88 in a state where the manned vehicle 8 is placed near the obstacle and causes the input device 88 to generate input data indicating that an obstacle is present on the transport path HL.

The arithmetic processing unit 82 acquires the input data from the input device 88 and the position data from the position detector 85. The manned vehicle 8 and the obstacle are adjacent to each other, and a GPS position of the manned vehicle 8 is substantially equal to a GPS position of the obstacle. Therefore, the position data of the manned vehicle 8 disposed close to the obstacle can be regarded as the position data of the obstacle. The arithmetic processing unit 82 generates the position data indicating the position of the obstacle based on the position data of the manned vehicle 8 when the input data has been input.

Incidentally, the input device 88 and the display device 89 may be integrated, and the driver WM may input the position data of the obstacle found by referring to a map of the mine displayed on the display device 89 using the input device 88 so that the position data is transmitted to the management device 10.

The arithmetic processing unit 82 transmits the position data of the obstacle to the management device 10 via the input/output unit 81 and the wireless communication device 84. The obstacle data acquisition unit 121 of the management device 10 acquires the position data of the obstacle (step SP2).

The detour course setting unit 126 of the management device 10 sets the detour course data indicating the detour course of the dump truck 2 traveling in accordance with the course data CS based on the position data of the obstacle acquired by the obstacle data acquisition unit 121 (step SP3).

Figure 11:
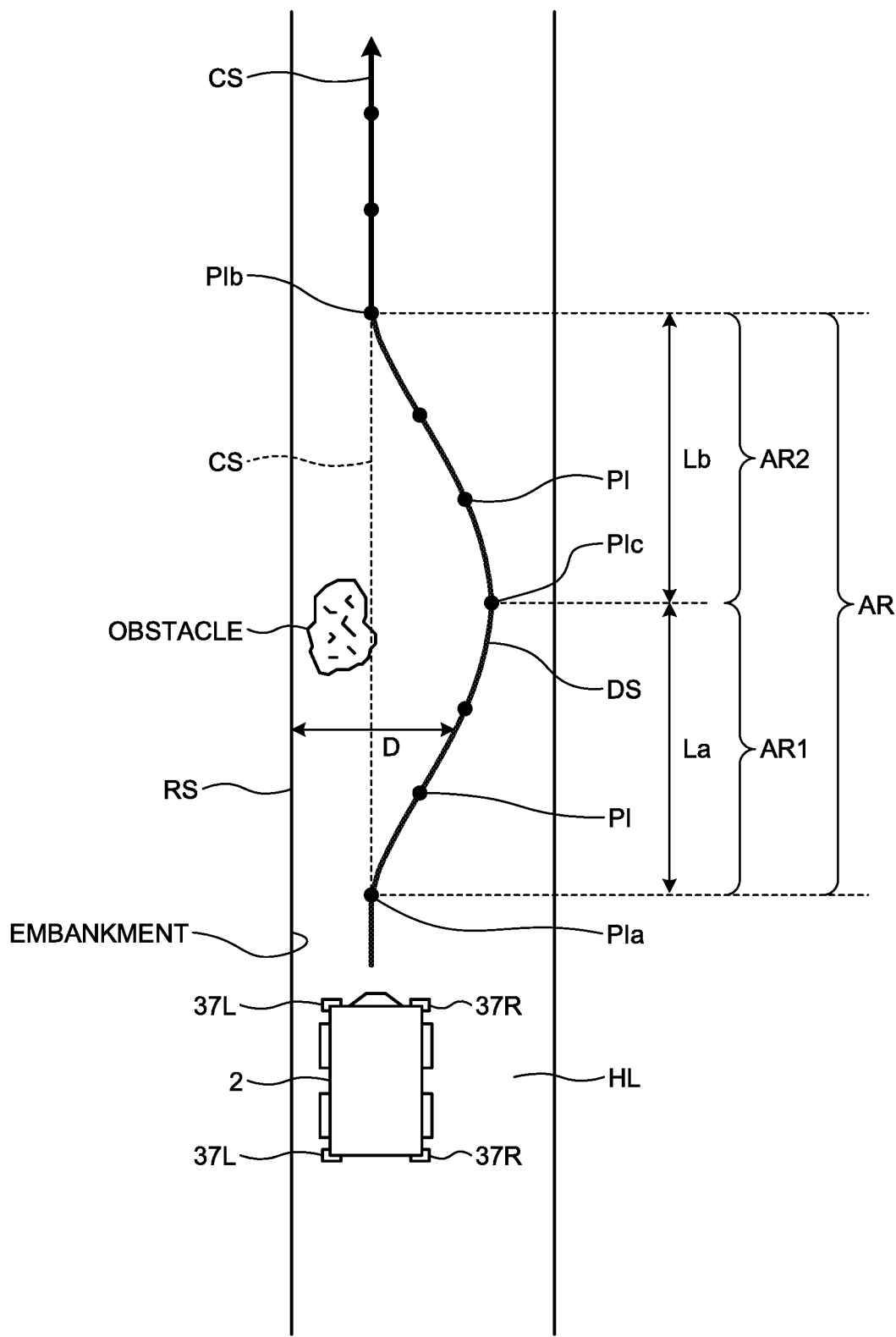
FIG. 11 is a view for describing the traveling control and the direction indicator control for the dump truck according to the present embodiment.

FIG. 11 is a schematic view for describing detour course data DS according to the present embodiment. As illustrated in FIG. 11, there is an object beside the travel course indicated by the course data CS. An embankment or an artificial structure is exemplified as the object existing beside the travel course. A reflecting member or a guardrail is exemplified as the artificial structure. In the example illustrated in FIG. 11, the embankment exists beside the travel course.

The position data of the embankment is known data and is stored in the storage device 13. The position data of the embankment is acquired, for example, by a position investigation operation of the transport path HL that is performed in advance by the manned vehicle 8.

The course data setting unit 122 sets the course data CS based on the position data of the embankment stored in the storage device 13 as an example. That is, the course data setting unit 122 sets the course data CS such that the dump truck 2 does not hit the embankment with reference to the position data of the embankment. In the present embodiment, the course data CS is set to be substantially parallel to the embankment.

In the following description, a course parallel to the course data CS, which is defined by the embankment, is appropriately referred to as a reference course. Reference course data RS indicating the reference course includes position data of the embankment. The reference course data RS is set beside the course data CS. The reference course data RS may be set along an edge of the embankment.

As illustrated in FIG. 11, the detour course data DS is set so as to avoid an obstacle. Since the obstacle is present on the travel course indicated by the course data CS, the detour course setting unit 126 sets the detour course so as to avoid the obstacle based on the position data of the obstacle.

In the example illustrated in FIG. 11, the course data CS is set such that the dump truck 2 travels on a left lane of the transport path HL. That is, the course data CS is set such that the dump truck 2 travels near a left embankment with respect to the traveling direction. Therefore, the detour course setting unit 126 also sets the detour course data DS on the right side of the course data CS. As a result, the dump truck 2 can travel on the transport path HL without hitting the left embankment.

In the present embodiment, the detour course setting unit 126 sets the detour course with reference to the reference course. As illustrated in FIG. 11, the detour course has a first range AR1 in which the dump truck 2 is caused to travel so as to move away from the reference course defined by the embankment to the right, and a second range AR2 in which the dump truck 2 is caused to travel such that the dump truck 2 approaches the reference course after passing the obstacle.

The detour course data DS is set so as to branch to the right from a course point PIa of the course data CS, and then, set so as to join the course data CS at a course point PIb of the course data CS. The course point PIa is set behind the position of the obstacle in the traveling direction of the dump truck 2 by a first distance La (front side in the traveling direction). The course point PIb is set ahead of the position of the obstacle in the traveling direction of the dump truck 2 by a second distance Lb (back side in the traveling direction). The course point PIa is a branch point between the course data CS and the detour course data DS. The course point PIb is a junction point between the course data CS and the detour course data DS.

The detour course data DS includes a course point PIc that is the closest to the position data of the obstacle, and further, is a point where the dump truck 2 faces the same direction as the traveling direction of the transport path HL when traveling. The first range AR1 is a range between the course point PIa and the course point PIc in the traveling direction of the dump truck 2. The second range AR2 is a range between the course point PIc and the course point PIb in the traveling direction of the dump truck 2.

After the detour course data DS is set, the turn signal data setting unit 123 sets the turn signal data for controlling the direction indicator 37 of the dump truck 2 (step SP4).

The turn signal data setting unit 123 sets the turn signal data based on a deviation amount D between the reference course and the detour course. The turn signal data setting unit 123 sets the turn signal data such that the direction indicator 37 is operated in the range AR between the course point PIa, defined at the position behind the course point PIc indicating the position of the obstacle in the traveling direction of the dump truck 2 by the first distance La, and the course point PIb defined at the position ahead of the course point PIc indicating the position of the obstacle by the second distance Lb. That is, the turn signal data setting unit 123 sets the turn signal data based on the course point PIa indicating a position of the branch point between the course data CS and the detour course data DS and the course point PIb indicating a position of the junction point between the course data CS and the detour course data DS. The operation of the direction indicator 37 is started at the course point PIa which is the position of the branch point between the course data CS and the detour course data DS, and the operation of the direction indicator 37 is terminated at the course point PIb which is the position of the junction point between the course data CS and the detour course data DS. Incidentally, the turn signal data may be set such that the direction indicator 37 is operated from the front side of the course point PIa or the turn signal data may be set such that the direction indicator 37 is turned off at the back of the course point PIb.

In the present embodiment, the turn signal data setting unit 123 sets the turn signal data for controlling the direction indicator 37 of the dump truck 2 based on the deviation amount D between the reference course data RS indicating the reference course and the detour course data DS indicating the detour course.

In the first range AR1, the dump truck 2 travels in the traveling direction while moving to the right so as to move away from the reference course data RS in accordance with the detour course data DS. In the first range AR1, the deviation amount D between the reference course data RS and the detour course data DS gradually increases in the traveling direction of the dump truck 2.

In the second range AR2, the dump truck 2 travels in the traveling direction while moving to the left so as to approach the reference course data RS in accordance with the detour course data DS. In the second range AR2, the deviation amount D between the reference course data RS and the detour course data DS gradually decreases in the traveling direction of the dump truck 2.

The turn signal data setting unit 123 sets the turn signal data such that the turn signal lamp 37R is operated in the first range AR1 and the turn signal lamp 37L is operated in the second range AR2.

In the present embodiment, the turn signal data setting unit 123 sets turn signal data in the detour course data DS generated by the detour course generation unit 122. The turn signal data setting unit 123 adds the turn signal data for operating the turn signal lamp 37R at the course point PIa and each of the plurality of course points PI between the course point PIa and the course point PIc among the plurality of course points PI of the detour course data DS. In addition, the turn signal data setting unit 123 adds the turn signal data for operating the turn signal lamp 37L to the course point PIb and each of the plurality of course points PI between the course point PIb and the course point PIc among the plurality of course points PI of the detour course data DS. Incidentally, the turn signal data may be added to the course point PI behind (the front side of) the course point PIa in the traveling direction of the dump truck 2 and to the course point PI ahead (the back side) of the course point PIb.

The input/output unit 15 of the management device 10 outputs the traveling condition data including the turn signal data and the course data CS to the dump truck 2 via the wireless communication device 18 (step SP5).

The dump truck 2 controls the direction indicator 37 in accordance with the turn signal data supplied from the management device 10. When the dump truck 2 passes through the course point PIa and travels in accordance with the detour course data DS in the first range AR1, the turn signal lamp 37R is turned on or blinks. When the dump truck 2 passes through the course point PIc and travels in accordance with the detour course data DS in the second range AR2, the turn signal lamp 37L is turned on or blinks.

Incidentally, the present embodiment has been described regarding the detour course data DS that is set when the course data CS is set to be close to the left embankment and the dump truck 2 travels on the left lane of the transport path HL. When the course data CS is set to be close to an embankment on the right and the dump truck 2 travels on a right lane of the transport path HL, the detour course data DS is set in the first range AR1 of the detour course data DS such that the dump truck 2 travels in the traveling direction while moving to the left and moves away from the reference course data RS (the right embankment). The detour course data DS is set in the second range AR2 of the detour course data DS such that the dump truck 2 travels in the traveling direction while moving to the right and approaches the reference course data RS (the right embankment). The turn signal data is set such that the turn signal lamp 37L is operated in the first range AR1 and the turn signal lamp 37R is operated in the second range AR2.

That is, when the reference course data RS is set on one side in the vehicle width direction of the dump truck 2, the detour course setting unit 126 sets the detour course data DS such that the dump truck 2 travels in the traveling direction while moving to the other side in the vehicle width direction in the first range AR1, and sets the detour course data DS such that the dump truck 2 travels in the traveling direction while moving to the one side in the vehicle width direction in the second range AR2. The turn signal data setting unit 123 sets the turn signal data such that the turn signal lamp provided on the other side in the vehicle width direction is operated in the first range AR1 and the turn signal lamp provided on the one side in the vehicle width direction is operated in the second range AR2.

As described above, the turn signal data for controlling the direction indicator 37 of the dump truck 2 is set in the set detour course data DS according to the present embodiment. Since the direction indicator 37 is controlled based on the set turn signal data, a driver of the manned vehicle 8 around the dump truck 2 or a worker working on the mine can grasp the traveling direction of the dump truck 2. Therefore, the safety in the mine is improved.

In addition, the turn signal data is set based on the deviation amount D between the reference course and the detour course in the present embodiment. In addition, the turn signal data is set based on at least one of the position of the branch point between the course data CS and the detour course data DS and the position of the junction point between the course data CS and the detour course data DS in the present embodiment. As a result, the direction indicator 37 is appropriately operated, and thus, the safety in the mine is further improved.

In addition, in the present embodiment, the turn signal data setting unit 123 sets the turn signal data such that the direction indicator 37 is operated between the position behind the position of the obstacle by the first distance La and the position ahead of the position of the obstacle by the second distance Lb in the traveling direction of the dump truck 2 with reference to the position data of the obstacle acquired by the manned vehicle 8. As a result, the driver of the manned vehicle 8 around the dump truck 2 or the worker working on the mine can grasp the traveling direction of the dump truck 2 traveling so as to avoid the obstacle.

In addition, the detour course includes the first range AR1 in which the dump truck 2 is caused to travel so as to move away from the reference course in the traveling direction of the dump truck 2, and the second range AR2 in which the dump truck 2 is caused to travel such that the dump truck 2 approaches the reference course after passing the obstacle in the present embodiment. The turn signal data setting unit 123 sets the turn signal data such that the turn signal lamp far from the reference course is operated in the first range AR1 and the turn signal lamp close to the reference course is operated in the second range AR2 among the turn signal lamp 37R and the turn signal lamp 37L. As a result, it is possible to operate the appropriate turn signal lamp between the turn signal lamp 37R and the turn signal lamp 37L with reference to the reference course. In addition, the dump truck 2 can detour the obstacle without hitting the embankment.

Figure 12:
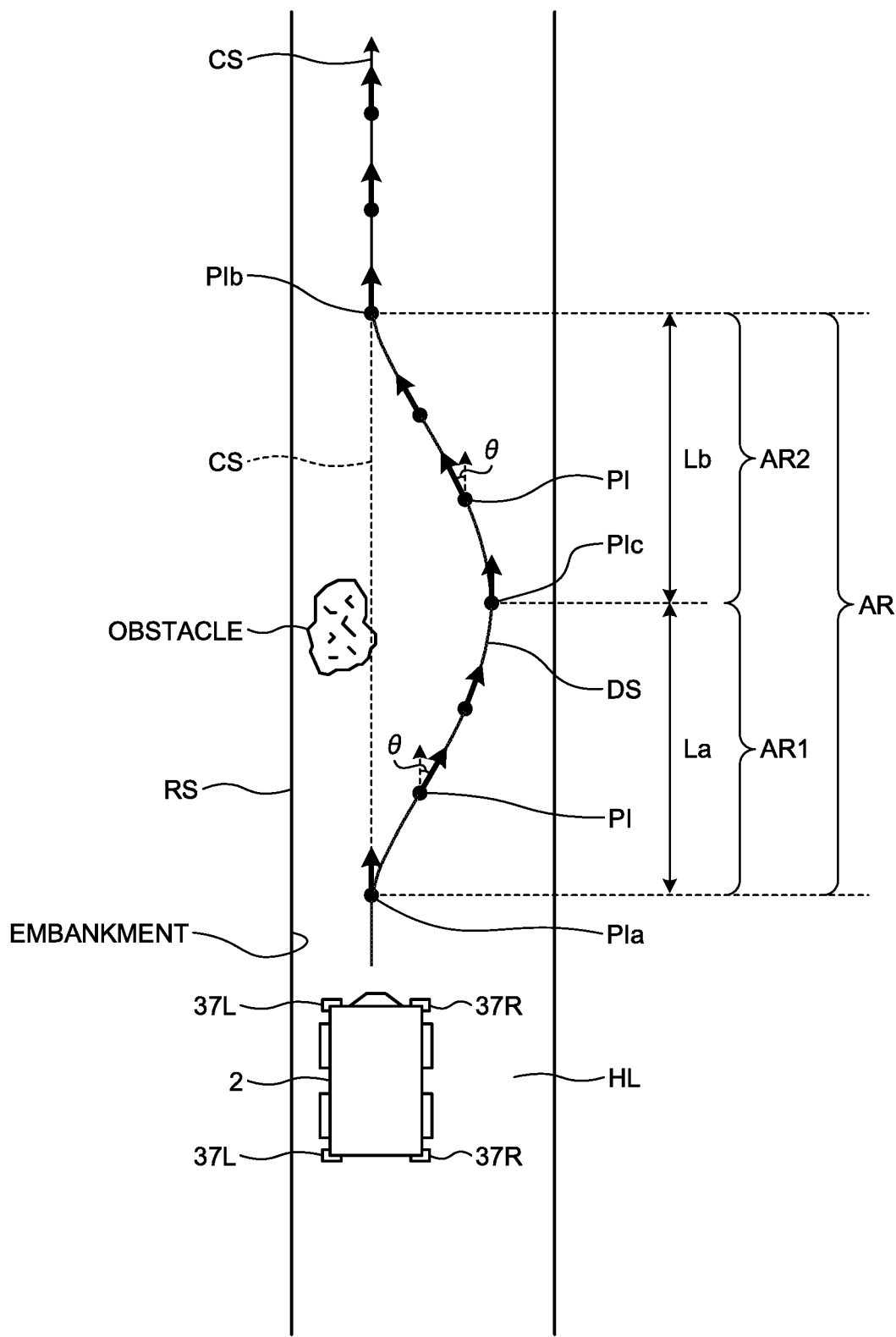
FIG. 12 is a view for describing the traveling control and the direction indicator control for the dump truck according to the present embodiment.

Incidentally, the deviation amount D between the reference course and the detour course is a deviation amount in distance between the reference course and the detour course in a direction (lateral direction) orthogonal to the traveling direction of the dump truck 2 in the above-described embodiment. The deviation amount D may be a deviation amount between a target orientation of the dump truck 2 in the reference course and a target orientation of the dump truck 2 in the detour course at the same position in the traveling direction of the dump truck 2. FIG. 12 is a schematic view for describing the detour course data DS according to the present embodiment. The detour course data DS includes the plurality of course points PI similarly to the above-described embodiment. As described above, each of the plurality of course points PI includes the target orientation data of the dump truck 2 at the position where the course point PI has been set as well as the target absolute position data of the dump truck 2 and the target traveling speed data of the dump truck 2 at the position where the course point PI has been set. For example, when the target orientation of the course point PI of the detour course is on the right side relative to the target orientation of the course point PI of the reference course, the turn signal data setting unit 123 causes the turn signal lamp 37R to be turned on or blink based on a deviation amount θ between the target orientation in the reference course and the target orientation in the detour course. When the target orientation of the course point PI of the detour course is on the left side relative to the target orientation of the course point PI of the reference course, the turn signal data setting unit 123 causes the turn signal lamp 37L to be turned on or blink based on a deviation amount θ between the target orientation in the reference course and the target orientation in the detour course.

Incidentally, the reference course data RS is set based on the embankment beside the course data CS in the above-described embodiment. The reference course data RS may not be necessarily set based on the embankment. For example, the reference course data RS may be course data CS before the detour course data DS is generated.

Incidentally, the turn signal data set by the turn signal data setting unit 123 is added to the traveling condition data generated by the course data generation unit 122, and the traveling condition data including the turn signal data is transmitted from the management device 10 to the dump truck 2 in the above-described embodiment. The traveling condition data may be transmitted from the management device 10 to the dump truck 2, and the turn signal data may be transmitted from the management device 10 to the dump truck 2 traveling in accordance with the traveling condition data every predetermined time.

Incidentally, the position data of the obstacle is output from the manned vehicle 8 to the management device 10 in the present embodiment. The position data of the obstacle may be output from the manned vehicle 8 to the dump truck 2. The control system 20 of the dump truck 2 may set the turn signal data based on the traveling condition data supplied from the management device 10 and the position data of the obstacle supplied from the manned vehicle 8. In addition, an obstacle detection sensor may be provided in front of the dump truck 2, and position data of an obstacle may be transmitted to the management device 10 when the dump truck 2 detects the obstacle at the front side in the middle of traveling.

Incidentally, the dump truck 2 is the unmanned dump truck in the respective embodiments described above. The dump truck 2 may be a manned dump truck that travels in accordance with the driver's operation. In the manned dump truck, an operation device such as a turn signal lever, which operates the direction indicator 37, is provided, and the operation device is operated by the driver. When the dump truck 2 turns right or left at the intersection IS, even if the driver neglects operating the operation device, the control system 20 intervenes in the operation of the operation device and causes the direction indicator 37 to be turned on or blink. That is, the control system 20 executes a so-called assist control that assists the driver's operation. As a result, the safety in the mine is secured.

Incidentally, a work machine is the dump truck that operates in the mine on the ground in the respective embodiments described above. The work machine may be a mining machine such as a wheel loader that operates in the mine on the ground.

Incidentally, the description has been given in the respective embodiments described above with the example in which the work machine is the mining machine that operates in the mine, but the work machine is not limited to the mining machine. The constituent elements that have been described in the above-described embodiments can be applied to any work machine used in the work site.

REFERENCE SIGNS LIST

1 MANAGEMENT SYSTEM
2 DUMP TRUCK (MINING MACHINE)
3 OTHER MINING MACHINE

4 MINING MACHINE
5 POSITIONING SATELLITE
6 REPEATER
7 CONTROL FACILITY
8 MANNED VEHICLE
9 COMMUNICATION SYSTEM
10 MANAGEMENT DEVICE
11 COMPUTER
12 PROCESSING DEVICE
13 STORAGE DEVICE
15 INPUT/OUTPUT UNIT
16 DISPLAY DEVICE
17 INPUT DEVICE
18 WIRELESS COMMUNICATION DEVICE
18A ANTENNA
20 CONTROL SYSTEM
21 TRAVELING DEVICE
22 VEHICLE BODY
23 VESSEL
24 DRIVE DEVICE
25 CONTROL DEVICE
26 WHEELS
27 AXLES
28 BRAKE DEVICE
29 STEERING DEVICE
31 TRAVELING SPEED DETECTOR
32 ACCELERATION DETECTOR
36 WIRELESS COMMUNICATION DEVICE
37 DIRECTION INDICATOR
37L TURN SIGNAL LAMP
37R TURN SIGNAL LAMP
41 INPUT/OUTPUT UNIT
42 OPERATION CONTROL UNIT
43 TURN SIGNAL DATA ACQUISITION UNIT
44 TURN SIGNAL CONTROL UNIT
45 ABSOLUTE POSITION DATA ACQUISITION UNIT
46 STORAGE UNIT
80 COMPUTER
81 INPUT/OUTPUT UNIT
82 ARITHMETIC PROCESSING UNIT
83 STORAGE UNIT
84 WIRELESS COMMUNICATION DEVICE
85 POSITION DETECTOR
88 INPUT DEVICE
89 DISPLAY DEVICE
121 OBSTACLE DATA ACQUISITION UNIT
122 COURSE DATA GENERATION UNIT
123 TURN SIGNAL DATA SETTING UNIT
124 ABSOLUTE POSITION DATA ACQUISITION UNIT
126 DETOUR COURSE SETTING UNIT
CR CRUSHER
DPA DISCHARGING SITE
HL TRANSPORT PATH
IS INTERSECTION
LPA LOADING SITE
PA WORK SITE
RP TARGET TRAVELING ROUTE.

The invention claimed is:

1. A work machine management system installed within a mine comprising:
an obstacle data acquisition unit that acquires position data of an obstacle interfering with at least one course point of a plurality of course points which are set in a travel course of a work machine which travels within the mine;
a course data generation unit that generates traveling condition data for controlling the work machine for each of the plurality of course points which are set at regular intervals;
a detour course setting unit that sets detour course data, with respect to the travel course, that is a detour course which branches from course data along which the work machine travels based on the position data of the obstacle;
a turn signal data setting unit that sets turn signal data to control, from branch to junction of the detour course, left and right direction indicators of the work machine for course points of the detour course data set by the detour course setting unit; and
a communication device that outputs the traveling condition data including the course points for which the turn signal data is set to the work machine,
wherein the traveling condition data comprises at least preconfigured i) target traveling speed, and ii) target orientation data.

2. The work machine management system according to claim 1, wherein
the turn signal data setting unit sets the turn signal data based on a deviation amount between a reference course and the detour course.

3. The work machine management system according to claim 1, wherein
the turn signal data setting unit sets the turn signal data based on a position of a branch point between the course data and the detour course data.

4. The work machine management system according to claim 1, wherein
the turn signal data setting unit sets the turn signal data such that the direction indicator is operated between a position behind a position of the obstacle by a first distance in a traveling direction of the work machine and a position ahead of the position of the obstacle by a second distance.

5. The work machine management system according to claim 1, wherein
the detour course has a first range in which the work machine is caused to travel so as to move away from a reference course and a second range in which the work machine is caused to travel so as to approach the reference course after the work machine passes the obstacle,
the direction indicator includes a first turn signal lamp disposed on a right side in a vehicle width direction of the work machine and a second turn signal lamp disposed on a left side, and
the turn signal data setting unit sets the turn signal data such that one of the first turn signal lamp and the second turn signal lamp is operated in the first range, and the other of the first turn signal lamp and the second turn signal lamp is operated in the second range.

6. The work machine management system according to claim 5, wherein
reference course data indicating the reference course has position data of an object existing beside a travel course indicated by the course data.

7. The work machine management system according to claim 5, wherein the turn signal data comprises data to turn ON a right signal lamp from the one or more turn signal lamps for a right turn, to turn ON a left signal lamp from the one or more turn signal lamps for a left turn, to simultaneously turn ON right and left turn signal lamps from the one or more lamps, or to turn OFF the one or more turn signal lamps.

8. A work machine management method implemented within a mine, comprising:
   acquiring position data of an obstacle interfering with at least one course point of a plurality of course points which are set in a travel course of a work machine which travels within the mine;
   generating traveling condition data for controlling the work machine for each of the plurality of course points which are set at regular intervals;
   setting detour course data, with respect to the travel course, that is a detour course which branches from course data along which the work machine travels based on the position data of the obstacle;
   setting turn signal data to control, from branch to junction of the detour course, left and right direction indicators of the work machine for course points of the detour course data; and
   outputting the traveling condition data including the course points for which the turn signal data is set to the work machine,
   wherein the traveling condition data comprises at least preconfigured i) target traveling speed, and ii) target orientation data.

* * * * *